United States Patent [19]

Howard et al.

[11] Patent Number: 5,201,795
[45] Date of Patent: Apr. 13, 1993

[54] ROCK BIT MANUFACTURING METHOD

[75] Inventors: Danny B. Howard; Daura Palmo, both of Harris County, Tex.

[73] Assignee: Cummins Tool Company, Houston, Tex.

[21] Appl. No.: 881,412

[22] Filed: May 11, 1992

[51] Int. Cl.⁵ ............................................. B21K 5/02
[52] U.S. Cl. ..................................... 76/5.1; 76/108.2; 29/898.042; 408/1 R; 82/1.11; 82/142; 51/288
[58] Field of Search ................. 76/101.1, 108.1, 108.2, 76/108.4, 5.1; 29/898.042; 408/1 R; 82/1.11, 142; 51/281 R, 288, 289 R, 291

[56] References Cited

U.S. PATENT DOCUMENTS

| | | |
|---|---|---|
| 4,158,973 | 6/1979 | Schumacher, Jr. et al. |
| 4,187,743 | 2/1980 | Thomas. |
| 4,276,946 | 7/1981 | Millsapps, Jr. |
| 4,599,921 | 7/1986 | Gaither et al. ........................ 76/108.2 |
| 4,711,143 | 12/1987 | Loukanis et al. |
| 4,982,496 | 1/1991 | Gaither et al. ........................ 76/108.2 |

OTHER PUBLICATIONS

*Supfina*, Operating Instructions for SE30 Superfinishing Attachments, Models 110 and 120.
"Using Your New Superfinishing Attachment," Supfina Machine Co., Inc.

*Primary Examiner*—Roscoe V. Parker

[57] ABSTRACT

Method and apparatus for forming a base defining a trunnion and a portion of a leg for a roller-cone-type rock bit. A workpiece is rough formed to comprise leg work, having a preliminary end surface, and trunnion work extending angularly from the leg work. An interface plate is mounted on a holder of a lathe with an indexing surface thereof facing generally radially inwardly but angled to correspond to a desired angular orientation of a trunnion in a finished bit. The workpiece is removably mounted on the interface plate, with the preliminary end surface abutting the indexing surface, by at least one pin-type connector projecting from one of the surfaces into the other. The trunnion work is then turned on the lathe. Other parts of the machining of the workpiece may be performed by removing the workpiece from the first interface plate and similarly mounting it on plates adapted for other machines, but otherwise similar to the first plate. The workpiece can subsequently be returned to the first interface plate for fine turning of the trunnion. Also, the various interface plates can be exchanged for other plates providing differently oriented indexing surfaces to machine parts for other bits of other sizes or designs. A relatively small part of the leg work is ultimately removed before incorporating the base in a bit.

32 Claims, 4 Drawing Sheets

ROCK BIT MANUFACTURING METHOD

BACKGROUND OF THE INVENTION

The present invention pertains to the manufacture of roller-cone-type rock bits generally in the manner described in U.S. Pat. No. 4,711,143. To facilitate understanding of the present disclosure, U.S. Pat. No. 4,711,143 is expressly incorporated herein by reference.

Briefly, the type of bit in question typically includes a body having a tool joint at one end for connecting the bit to the drill string. The other end is typically trifurcated, i.e. including three legs extending longitudinally generally in the opposite direction of the tool joint, radially displaced from the centerline of the bit, and circumferentially spaced from one another. At its outermost (lowermost in use) end, each leg has a trunnion extending angularly therefrom generally in a radially inward direction, and a respective roller cone is rotatably mounted on each of these trunnions. The number of legs, and thus the number of cones, can, of course, vary, but the vast majority of such rock bits include three legs and three cones.

Traditionally, probably the most common way of forming the main body of such a bit was to form three segments each extending the full length of the bit body, and each including a respective one of the legs as well as a one-third arcuate segment of the tool joint, and then to weld these segments together along joining lines extending generally longitudinally along the bit body. See U.S. Pat. No. 4,276,946 and U.S. Pat. No. 4,187,743 for examples of the forms of such segments.

There had been, however, other techniques in which a portion of the bit body including the tool joint and three stub-like portions of the legs would be formed, the remainders of the legs separately formed, and then joined to the stubs along generally horizontal or transverse surfaces. See U.S. Pat. No. 4,158,973.

Improvements over both of these prior methods were achieved by the technology described in the aforementioned U.S. Pat. No. 4,711,143. A main body member was provided, having a tool joint at one end and a plurality of leg portions or stubs at the other end. Such a body could be of new manufacture, or could be salvaged from a used bit. However, the outer surfaces of the leg stubs to which leg extensions would be welded were not straight horizontal, but were inclined longitudinally inwardly from their radially outer extremities to their inner extremities, preferably lying on a common conical locus. The end surfaces of the leg extensions which were welded to these outer surfaces of the leg stubs were correspondingly shaped.

A number of disadvantages have been encountered in forming the legs of such bits, both in the context of the traditional three segment method, and in the context of the last-mentioned technique wherein leg extensions are welded transversely onto leg stubs. Many of these disadvantages revolved around the machining of the trunnion, which typically includes at least one annular bearing surface and an annular, concave ball race. It is, of course, desirable that the bearing surface, and to a certain extent even the ball race, be nicely finished and otherwise adapted to reduce friction in use.

In the traditional tri-segment method of rock bit manufacture, the workpiece on which the trunnion must be formed typically has a length equivalent to the length of a complete bit body, including the tool joint. With such a large workpiece, it is, as a practical matter, impossible to form the trunnion, by turning, i.e. a machining process in which the workpiece is rotated relatively quickly while a non-rotating tool is applied to it. Because the trunnion extends angularly from the main length of the workpiece, turning would require rotation of that entire workpiece in an orientation in which the bulk of it would cause inordinate centrifugal forces, and this would exacerbate the problems already inherent in the overall bulk and weight of the workpiece.

Accordingly, in such bits, the trunnions are traditionally formed by a grinding process, in which the tool which removes metal from the work is rotated quickly, while the work is rotated slowly. As is well known in the machining arts, grinding has a number of disadvantages over turning, not the least of which are that it is time consuming and typically results in less perfect surface finish.

On the other hand, in those bit bodies in which the junctures were to run transversely, rather than longitudinally, it seemed, at least in theory, that turning might be feasible because of the ability to use a shorter workpiece. However, unexpected problems were encountered in practice. Although not nearly as long or bulky as the forgings used in traditional longitudinally joined bit bodies, the work on which the trunnion was machined had to have at least enough excess length at the end of the leg to permit it to be clamped into a traditional chuck on a lathe. The trunnion had to be rough turned, then heat treated, then returned to the lathe for fine turning or finishing. Due to the distortion experienced during the heat treating process, again related to the length of the leg extension, if the work were returned to the lathe after heat treating, and the leg extension replaced in the chuck as accurately as possible, the trunnion was no longer properly aligned with the axis of the lathe.

So difficult was this problem that it was actually found easier to remove the excess material from the leg extension, temporarily weld a tang to the leg extension, and "true" the tang to the trunnion, rather than attempt to work with the original leg extension workpiece. Later the tang would have to be removed. This procedure was, needless to say, time consuming, tedious, and difficult.

Furthermore, an inordinate number of mishaps occurred while fine turning the trunnions on those workpieces to which temporary tangs were attached.

SUMMARY OF THE INVENTION

The present invention provides improved methodology, fixturing, and other apparatus which, together with improvements in the form of the workpiece and its handling, allow a trunnion for a rock bit to be easily, safely, and reliably formed by turning, even when the turning must be done in two phases with a heat treatment step intervening, and without the need to make any intermediate changes in the portion of the workpiece by which the workpiece is connected to the lathe.

In accord with the present method, a workpiece is at least rough formed to comprise a leg extension work portion, having a preliminary end surface, and a trunnion work portion extending angularly from the leg extension work portion.

A first interface member is mounted on a rotatable holder portion of a lathe, with an indexing surface of the interface member facing generally radially inwardly but angled to correspond to a desired angular orientation of a trunnion in a finished bit. More specifically, the angular orientation of the indexing surface is designed to impart desired skew and/or twist angles to the trunnion, and therefore the cone mounted thereon, in the finished bit.

The workpiece is removably mounted on the first interface member, with the preliminary end surface abutting the indexing surface, by connector means comprising at least one pin-type connector projecting from one of these surfaces into the other. The trunnion work portion is then turned on the lathe.

Because of the unique way in which the work is held on the lathe, e.g. by a pin-type connector rather than by clamping, the leg extension work portion can be substantially less than that of the complete bit, even less than or equal to a desired length of one complete bit leg. Indeed, its length can be more nearly on the order of the desired length of the finished leg extension to be formed from that workpiece. This is one of the main factors in allowing a true turning process, as opposed to a grinding process, to be used for the formation of the trunnion.

In certain preferred forms of the invention, in addition to a threaded connecting bore for receiving the workpiece screw, at least one, and preferably two, positioning bores are provided in the preliminary end surface of the leg extension work portion to snugly receive positioning pins extending from the indexing surface of the first interface member. These positioning pins may also be removably but snugly received in respective holding bores in the indexing surface.

The first interface member is preferably a plate-like member mounted on a generally radially inwardly facing support surface of the holder portion of the lathe. That support surface is preferably interrupted by a gap, accessible from a radially outer side of the holder portion, and aligned both with an oversized (for the workpiece screw) bore in the first interface member and with the connecting bore of the workpiece. Thus, the workpiece screw can be inserted through the gap into the oversized bore and the connecting bore, and also removed therethrough.

The lathe is preferably also provided with an adjustable counterweight and an adjustable means for supporting the workpiece distal its preliminary end surface.

In the first turning, referred to above, the trunnion is at least roughly formed. The workpiece may then be removed from the first interface member, heat treated, remounted on the first interface member, and the trunnion fine turned on the same lathe. It has been found that using the method and apparatus of the present invention results in sufficient accuracy, retained after heat treating, that the trunnion remains true after remounting, particularly if the work is remounted on the same interface member using the same type of connector means.

After the rough turning and removal of the workpiece from the first interface member, but before the remounting and fine turning, further machine work may be done. At least some of this is preferably done by mounting the workpiece on a second interface member, similar to the first interface member in indexing surface and orientation, and by similar connector means, but the second interface member being adapted for mounting on a different type of machine from the lathe, e.g. a drill press.

Preferably, this additional machine work includes the formation of a ball loading bore through the workpiece from the shirttail surface through the ball race.

A branch lubricant supply bore is also formed, intersecting the ball loading bore and opening through the cylindrical bearing surface. Because this branch bore is perpendicular to the bearing surface, and not interrelated with the skew and twist angles, the work need not be mounted on a special interface plate to form the branch bore, but rather can be chuck mounted. However, the edge of the branch bore opening through the bearing surface is preferably beveled.

If other machine work, e.g. machining of the shirttail surface, is done, the workpiece may be similarly mounted on a respective such interface member for each machine as needed. All of these intermediate machine processes are preferably done before the heat treating.

The beveling of the branch lubricant supply bore opening facilitates the preferred manner of fine turning of the bearing surface, which is done with a ceramic tool at a speed of at least 500 surface feet per minute. The ceramic tool is able to impart a very precise and highly polished surface to the bearing surface, but could be damaged by its passage over the opening of the branch lubricant supply bore were it not for the prior beveling.

In another aspect of preferred methods according to the invention, after the fine turning, the workpiece is again removed, removably mounted on still another interface member similar to the first, but on another lathe. The bearing surface is then super finished by rotating the workpiece on this other lathe while applying an abrasive stone-type tool to the bearing surface and reciprocating the stone-type tool parallel to the axis of the other lathe. This imparts a very fine and precisely controlled microscopic scoring to the bearing surface. It has been found that, rather than exacerbating frictional heating problems and the like, this precise microscopic scoring helps to retain lubricant on the bearing surface in use and actually provides for longer bearing life.

If, as is preferable, the interface members are removable from the lathes and other machines on which they are used, they may be readily replaced by other interface members, having dissimilar indexing surfaces, for quickly and easily converting the machinery for the machining of trunnions for bits of different sizes and/or designs.

After the work on the trunnion has been completed, a part of the leg extension work portion, including the preliminary end surface and the bores for the workpiece screw and positioning pins, can be removed by a cut which forms a secondary end surface, subsequently precisely machined. This cut is preferably made at a substantially non-perpendicular angle to the centerline of the trunnion, so that the secondary end surface is inclined radially and longitudinally inwardly in the finished bit.

Various objects, features and advantages of the present invention will be made apparent by the following detailed description, the drawings, and the claims.

DETAILED DESCRIPTION

Figure 1:
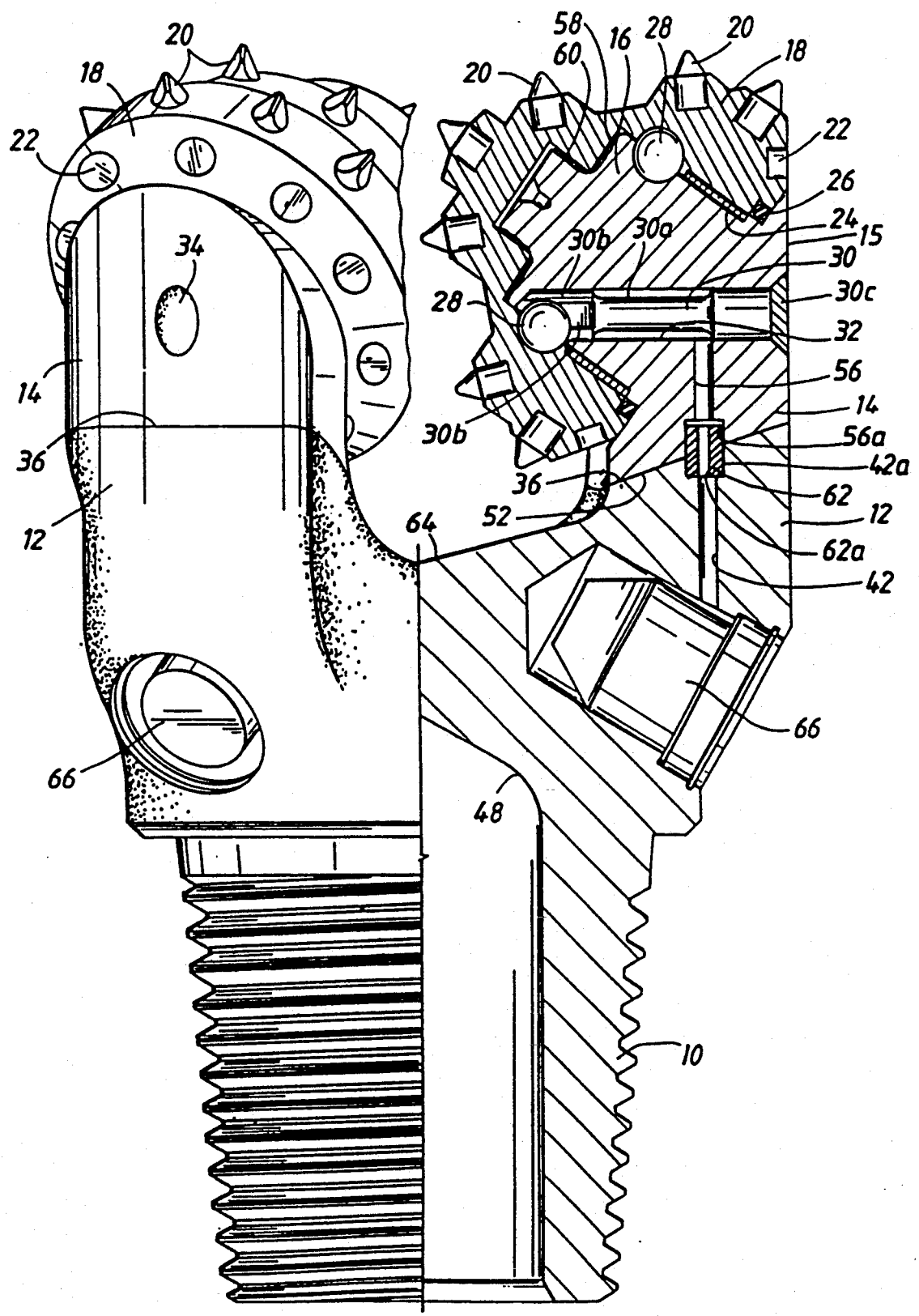
FIG. 1 is a longitudinal cross sectional view, with parts broken away, of a rock bit assembly of a type which may be formed in accord with the method of the present invention.

FIG. 1 illustrates a drill bit assembly made according to the method of the present invention. It will be understood that the bit is shown in a position it would most likely assume during the manufacturing process, but that its vertical orientation would be reversed in downhole use.

The bit assembly of FIG. 1 includes a bit body having an externally threaded pin connection 10 at one end. The bit body also includes three legs (only two of which are shown in FIG. 1) at the other end of the bit body, extending generally parallel to the bit centerline, but being radially offset from that centerline as well as circumferentially spaced from one another. Each of the bit legs has an inner portion or stub 12 and an outer extension 14. The leg portions 12, along with the pin 10 and the intermediate crown area 64 of the bit body comprise an integral main body member. This member may be salvaged from a used bit, or may be of new manufacture.

The outer portion 14 of each of the bit legs has an integral trunnion or journal member 16 extending angularly therefrom. Each leg extension 14 with its integral trunnion 16 will be jointly referred to as a "base" in this application.

A respective roller cone is mounted on each of the trunnions 16 for rotation with respect thereto. Each roller cone includes a cone body 18 of a suitable metal and a plurality of tungsten carbide inserts 20, mounted in the cone body 18 in the well known manner. The gauge area of each cone body 18 has wear inserts 22 mounted therein. Other types of cones, such as milled tooth cones, can also be used.

The interior of each cone body 18 and the exterior of its respective trunnion 16 have opposed cylindrical surfaces between which is mounted a journal bearing member 24. The interior of the cone body 18 has a counterbore located just outwardly of the bearing 24 and carrying an elastomeric O-ring type seal 26 which seals between the cone body 18 and the trunnion 16 at the wide end of the cone. Inwardly of the bearing 24, the trunnion 16 and cone body 18 are provided with opposed semi-circular ball races within which are disposed a plurality of balls 28. Although the balls 28 may take some bearing load, their primary function is to retain the cone body 18 on the trunnion 16. The assembly is held together by the balls 28, which in turn are retained by a pin 30 in a loading bore 32 through the base 14, 16. Pin 30, whose configuration and function will be described more fully hereinbelow, is retained by welding.

In manufacturing the main body member 10, 12, the outer surfaces 36 of the respective leg portions 12 are simultaneously machined, by known techniques and available equipment, to lie on a common locus defining a surface of revolution, preferably a cone. (See U.S. Pat. No. 4,711,143). Thus the surfaces 36 of the three leg portions 12 are concave, lie on a common conical locus coaxial with the centerline of the bit, and are inclined longitudinally inwardly from their radially outer extremities to their radially inner extremities.

Each of the leg portions 12 has a lubricant supply channel 42 extending generally lengthwise therethrough. Each lubricant supply channel 42 opens through the outer or end surface 36 of the respective leg portion 12. The end of each channel 42 opening through the respective surface 36 is counterbored, as shown at 42a.

As is conventional, the main body member 10, 12 has three mud openings (not shown) circumferentially spaced and interposed between the leg portions 12. The mud openings communicate via angular branch bores (not shown) with a large central bore 48 in the pin end of the member 10, 12. Each mud opening is adapted to receive a wear-resistant nozzle, and in use, drilling fluid is directed through bore 48 and the communicating branch bores and nozzles to cool the cones 18 and flush away rock cuttings.

The main body member 10, 12, as thus far described, is substantially ready for assembly with the other bit parts and welding.

Meanwhile, the cone assemblies will have been prepared as follows.

Figure 2:
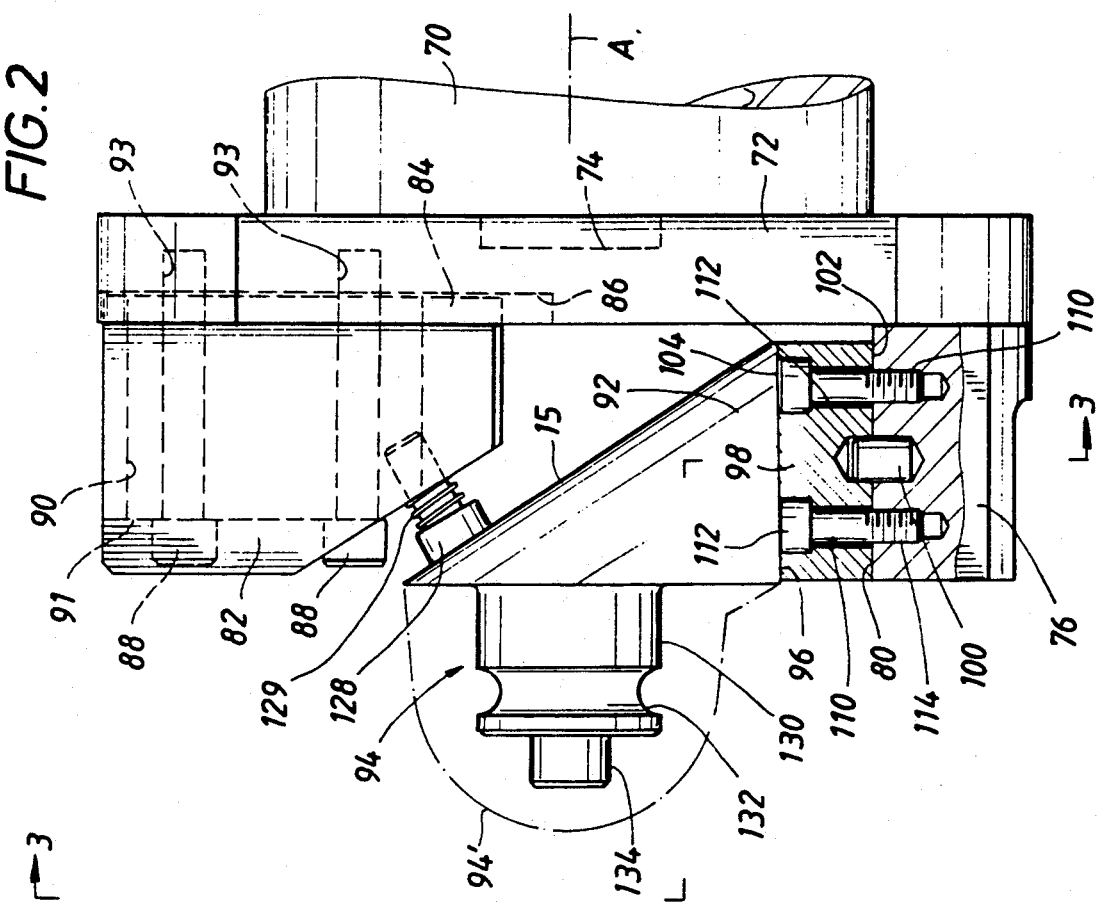
FIG. 2 is a side view of a first lathe in accord with the present invention and illustrating some of the first steps of the method.
Figure 3:
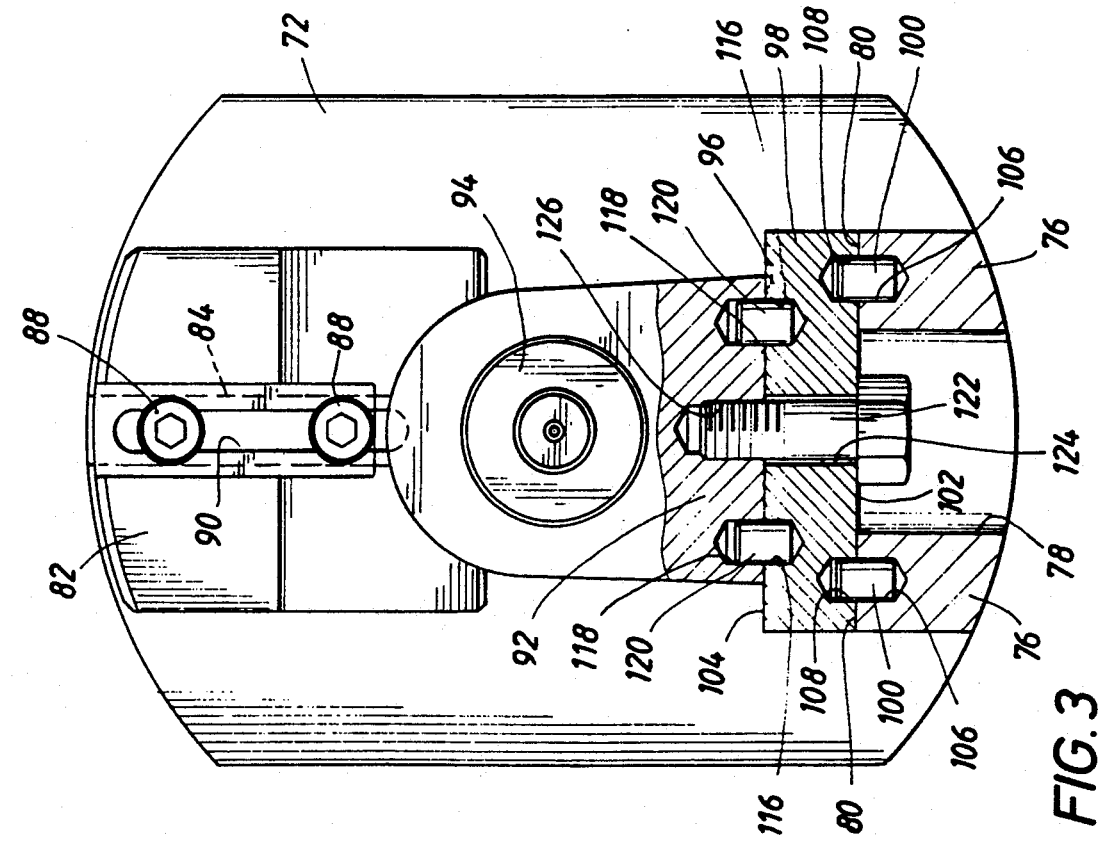
FIG. 3 is a partial transverse sectional, partial elevational view taken on the line 3—3 of FIG. 2.

Referring now to FIGS. 2 and 3, there is shown a portion of a first lathe used for certain portions of the method of forming the trunnion 16. The lathe includes a rotatable spindle 70 which is rotated about its axis or longitudinal centerline a by a motor connected to it in the usual manner. An end plate 72 is fixed to the end of spindle 70 for rotation therewith by any suitable means, as diagrammatically indicated at 74. Instead of a conventional chuck, a pair of holder blocks 76 are fixed, in any suitable manner, to the longitudinally outer face of plate 72 for joint rotation therewith. In this specification, terms such as "longitudinally," "radially," and "circumferentially" will be used with reference to the axis A unless otherwise noted. As best seen in FIG. 3, holder blocks 76 are spaced apart circumferentially so that a gap 78 is formed between them. The radially inwardly facing faces 80 of blocks 76 may be considered to jointly define a support surface interrupted by the gap 78.

Diametrically opposite holder blocks 76 is a counterweight 82 adjustably mounted on plate 72. A radially oriented key 84 on the counterweight 82 is received in a radial groove 86 in plate 72 for radial adjustment of the counterweight 82 so that it can properly balance different sizes and shapes of workpiece. When the counterweight has been placed in a desired position, it can be retained there by screws 88 passing through a slot 90 in the counterweight and threaded into suitable threaded bores 93 in plate 72. As shown in FIG. 2, slot 90 has an outermost widened section forming shoulders 91 to abut the heads of the screws 88.

FIGS. 2 and 3 also show the partially finished workpiece destined to form one of the cone-mounting bases of a drill bit of the type shown in FIG. 1. The workpiece includes a leg extension work portion 92, having a preliminary end surface 96, and a trunnion work portion 94 extending angularly from the leg extension work portion 92. The workpiece is at least rough-formed to provide the two angularly disposed work portions 92 and 94 prior to being placed in the lathe. The phantom line 94' may diagrammatically represent the trunnion work portion 94 prior to turning in the lathe.

To mount the workpiece 92, 94 in the lathe, an interface plate 98 is used. Interface plate 98 has a base surface 102 for resting on the support surface 80, and an indexing surface 104, facing generally radially inwardly. Surface 104 is angularly oriented with respect to surfaces 80 and 102 so as to correspond to, i.e. impart to trunnion work portion 94, the desired skew and twist angles of the trunnion to be turned, as that trunnion will be oriented in the finished bit design.

To accurately position interface plate 98 with respect to the holder blocks 76, first positioning pins 100 are snugly fitted into bores 106 in the respective holder blocks 76. Then, respective bores 108 in the plate 98 are snugly fitted over the pins 100. Because of the smooth sides and snug fits of the pins 100 in their respective sets of opposed bores 106 and 108, the positioning is more accurate than if it were achieved by the same means used to connect plate 98 to the blocks 76. The latter function is served by interface screws 110 which pass through oversized bores 112 in plate 98 and are threaded into tapped bores 114 in blocks 76. The oversizing of the bores 112 allows the screws 110 to be threaded into the tapped bores 114 even if the precise positioning provided by pins 100 causes bores 112 and 114 to be slightly displaced from coaxial alignment. There are two screws 110 for each block 76, but only one set is shown, in FIG. 2. FIG. 2 also shows that the bores 112 are counterbored to receive the heads of the screws 100, which are short enough to fit completely into bores 112, so that they do not interrupt or jut out from the indexing surface 104.

The workpiece 92, 94 is connected to the interface plate 98 in much the same manner that the plate 98 is connected to blocks 76, with its preliminary end surface 96 abutting the indexing surface 104 so that the angular orientation of indexing surface 104 is imparted to the workpiece. Specifically, the plate 98 has a pair of smooth walled positioning bores 116 extending in through surface 104, and the leg extension work portion 92 of the workpiece has a similar pair of positioning bores 118 extending in through its preliminary end surface 96. The bores 116 and 118 are precisely located so that, when aligned, they will properly position the workpiece with its trunnion work portion 94 aligned with the axis A of the lathe. Smooth walled positioning pins 120 are snugly interfitted between respective sets of opposed bores 116 and 118 to achieve this positioning. Then, a large workpiece screw 122 is inserted through gap 78 and an oversized bore 124 in plate 98 and threaded into a tapped bore 126 in the leg extension work portion 92.

Two adjustable bracing screws, one of which is shown at 128, are threaded into counterweight 82 in such position that, by advancing them outwardly from their bores in the counterweight, their heads can be brought into abutment with a radially inner portion of the workpiece near the juncture of portions 92 and 94. A respective spring 129 abuts the head of each screw 128 and the opposed counterweight 82 to keep the screw 128 from working out of the desired position.

With the work 92, 94 thus mounted in the lathe, the trunnion work portion 94 is turned using a tool 93 (FIG. 6) to form an innermost cylindrical bearing surface 130, a ball race 132, another short cylindrical section 135 (slightly smaller than bearing surface 130), and a substantially reduced diameter nose portion 134. This step of the work is diagrammatically indicated in step A of FIG. 6.

The manner in which the work is connected to the lathe, unlike a conventional chuck, requires only enough excess length of the leg extension work portion 92 to allow for the short bores 118 and 126. Thus, the trunnion work portion 94 can be accurately and precisely turned, even at high speeds, without the generation of undue centrifugal forces, and thus without the need for the lathe to be exceptionally large, heavy, or otherwise unusual in any way which would make it unduly expensive or impractical. Not only can the work be accurately and precisely rotated at a sufficient speed to allow true turning, as opposed to grinding, but the work can even be rotated at the very high speeds required for the use of superior ceramic cutting tools.

After the trunnion work portion 94 is at least roughly turned to the configuration 130, 132, 134, the workpiece 92, 94 is removed from the lathe. Further machine work may then be performed, and this may include several different types of machining processes. For at least some of such processes the workpiece 92, 94 may be simply and conveniently mounted on the respective machine by an interface member similar to plate 98 in the orientation of its indexing surface and its manner of connection to the workpiece, but adapted as necessary for connection to the respective machine. An example is the formation of the ball-loading bore 32 which opens through the ball race 132. However, additional machining steps may be performed, e.g. machining of shirttail surface 15 prior to formation of bore 32.

Figure 6:
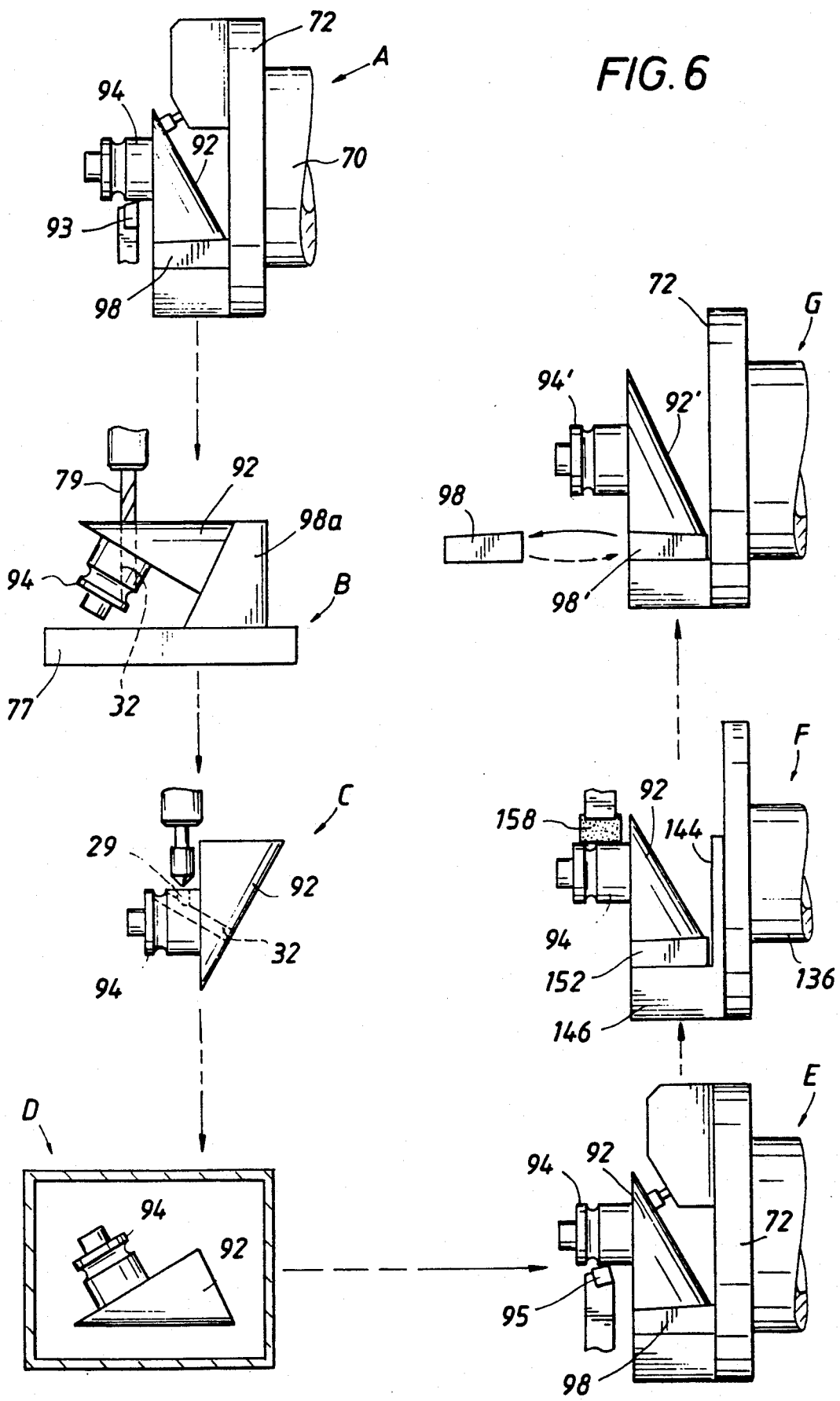
FIG. 6 is a schematic illustrating steps of an exemplary method according to the invention.

FIG. 6 diagrammically illustrates formation of bore 32 at step B. The work is mounted on a second interface member 98a, having an indexing surface and connection means similar to those of plate 98, but adapted for mounting on a machine 77 such as a drill press, so that the ball loading bore 32 can be formed by tool 79, the bore 32 extending from the shirttail portion 15 through the ball race 132.

Machining of some formations does not require mounting on a special interface plate. For example, a lubricant supply branch bore 29 (FIGS. 4 and 6, c) intersects bore 32 and opens through bearing surface 130 perpendicular thereto. Bore 29 may be formed with the work held in a more conventional chuck. However, it is preferable that the end of bore 29 opening through surface 130 be bevelled, as indicated at c in FIG. 6.

Next, the work, or at least its trunnion portion 94 is heat treated as shown at step D. Here again, if any fixturing is required, uniformity is possible, i.e. the work can be mounted on a suitable interface member for heat treatment by means of pins received in bores 116 and a screw threaded into bore 126.

Next, the treated work is returned to the lathe shown in FIGS. 2 and 3, as indicated at step E, i.e. remounted on the first interface plate 98 in the same manner as was done for the first or rough turning. So precise is the positioning provided by the interface plate 98, pins 120, and screw 122, and so precise is the turning operation which was previously performed on the relatively short workpiece, that, even after the further machining and heat treatment, the remounting of the work in the lathe of FIGS. 2 and 3 will place the work portion 94 in sufficiently precise alignment with axis A.

A second or fine turning can then be performed at high speed, i.e. at least 500 surface feet per minute, preferably using a ceramic tool 95. In addition to the high speed, the use of the ceramic tool, without damage thereto, is facilitated by the aforementioned beveling of the branch lubricant supply bore 29. This prevents damage to the ceramic tool as it passes that bore during turning. The fine turning provides a very precise and smooth surface to the work.

Next, it is preferable to super finish the bearing surface 130 in a manner which imparts a very fine and precisely controlled microscopic crosshatch pattern to that surface. Such a pattern not only does not harm or reduce the life of the bearing surface, but on the contrary, enhances that life by causing lubricant to cling better to the bearing surface.

Figure 4:
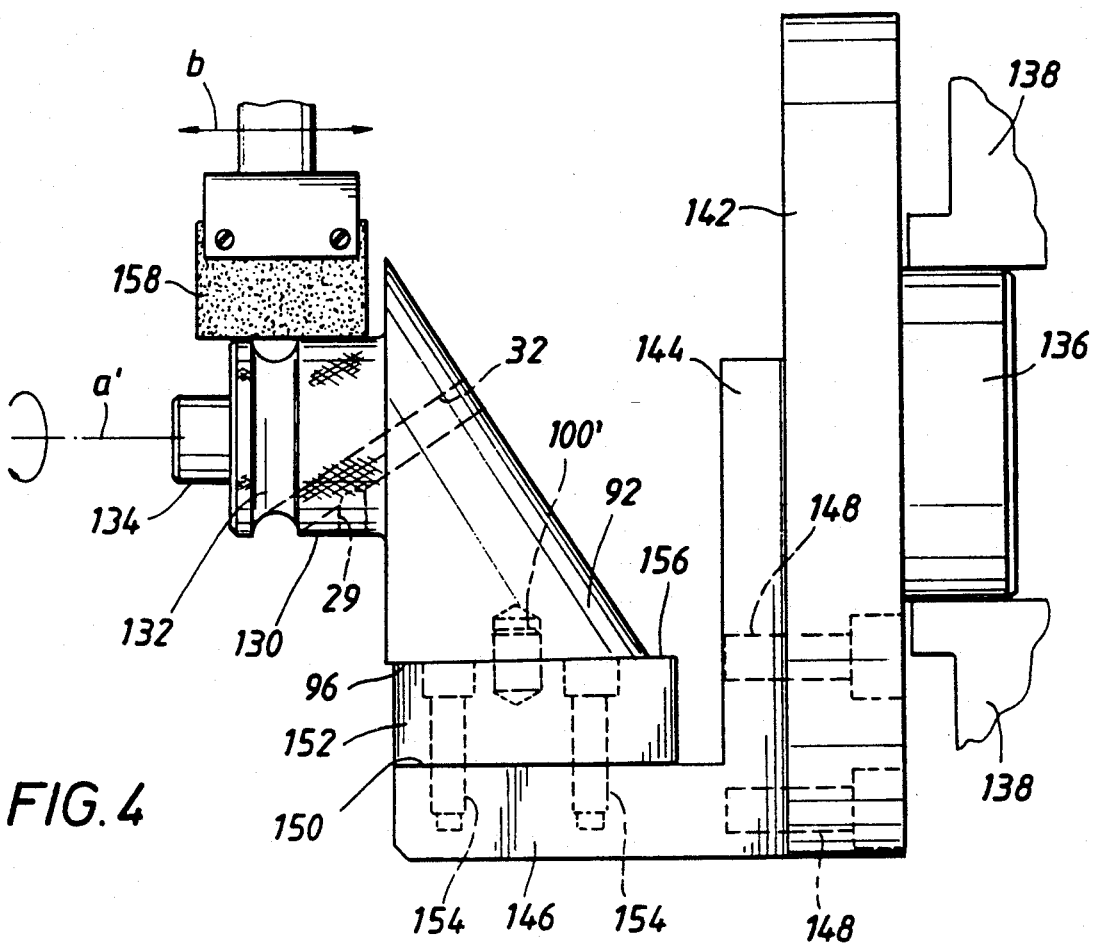
FIG. 4 is a view similar to that of FIG. 2 showing a second lathe used in performing some of the later steps of an exemplary method.

For this part of the process, the workpiece 92, 94 is placed in a different lathe, shown in FIG. 4 and diagrammatically at step F. This lathe has a rotatable end assembly including a stub shaft 136 connected to the rotatable portion of the lathe by three jaws, two of which are shown at 138. A rotatable plate 142 is provided on the outer end of stub shaft 136. An L-shaped holder has one leg fixed to plate 142 by screws 148, and another leg 146 extending forward and providing a radially inwardly facing support surface 150.

An interface plate 152 is mounted on surface 150 in substantially the same manner as plate 98 is mounted on blocks 76, including screws 154 and positioning pins (not shown). Likewise, the leg extension work portion 92 is connected to the plate 152 with its end surface 96 abutting an indexing surface 156 of the plate 152. The angle of surface 156 is similar to that of surface 104, as is the manner of connecting the work portion 92 to plate 152, the latter including positioning pin 100' and other parts not shown. It will be understood that holder 146 will have a radially opening interruption allowing a workpiece screw to be passed through plate 152 and threaded into work portion 92. Because the work depicted in FIG. 4 is done at a slower speed, there is no need for a counterweight on the lathe of FIG. 4.

Instead of a cutting tool, a roughened stone-type tool 158 is applied to the trunnion work portion 94, more specifically, its larger diameter cylindrical surface 130, as the work is rotated by the lathe. In addition, the tool 158 is simultaneously reciprocated paralled to the axis a' of rotation as indicated by the arrow b. This super finishes the bearing surface 130, as aforementioned. In preferred versions of the invention, the stone is used alone in a first step, then with a lapping compound in a second step, and finally with an abrasive pad, such as that sold under the trademark "Scotchbrite" between the work and the stone. The crosshatch grooves thus formed are microscopic in magnitude, so that they do not detract from the fine finish of the bearing surface 130, but do provide the aforementioned lubricant retention effect.

Figure 5:
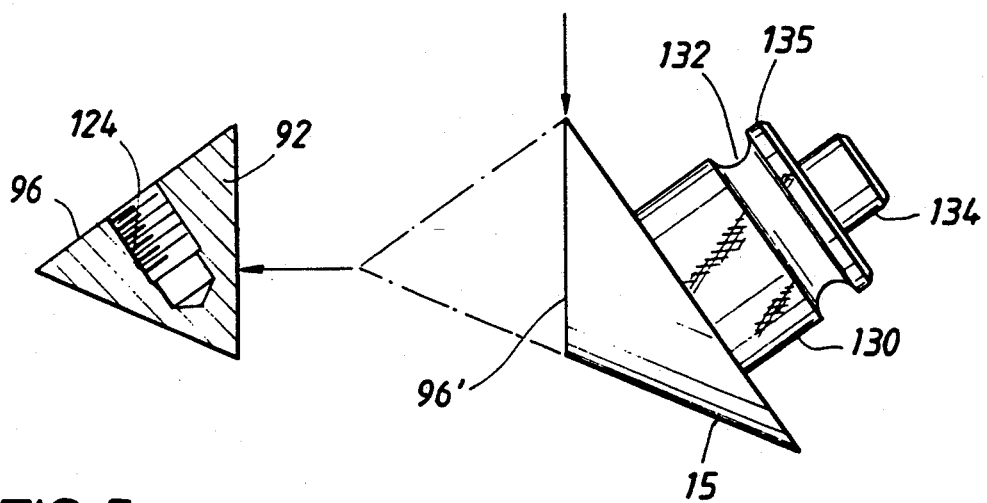
FIG. 5 is a view of a nearly finished workpiece showing how and where the connector portion is cut away.

Next, as indicated in FIG. 5, a portion of the leg extension workpiece 92 is removed, and more specifically, that portion including the bores 124 and 116 is removed, to form a near-final end surface 96'. Although this surface will be further machined to cause it to conform to the same conical locus as the surfaces 36 (FIG. 1), this process can be shortened by removing the excess portion by a cut disposed at an angle with respect to the preliminary end surface 96, and with the angle of that cut roughly approximating the desired final configuration, i.e. inclined longitudinally and radially inwardly with respect to the finished bit.

After the final machining, the intermediate end surface 96' will be reformed to the final end surface 52 (FIG. 1).

The lubricant channel 56 will be formed from that end surface inwardly to intersect the ball loading bore 32 and counterbored. The bearing 24, seal 26, and cone 18 will be placed on the trunnion, cone 18 emplaced, balls 28 loaded into their race through bore 32, and then a retainer pin 30, reduced in diameter to allow lubricant flow therepast, inserted into the bore 32 to retain the balls in a well-known manner. The pin itself is retained by a plug 30C welded into the outer end of the ball loading bore.

Annular positioning pins 62 are installed in opposed counterbored portions of the lubricant supply bores 42 and 56 in the bit legs as the two portions 12 and 14 of each leg are matched up. The legs are then welded together along the surfaces 36 and 52. Lubricant supply devices 66 and mud nozzles are installed, and the bit is then complete.

It will be appreciated that the method of formation of the workpiece 92, 94 and its fixturing or manner of mounting on the lathe and other machines used in the process not only provides the aforementioned advantages vis-a-vis the turning process itself, but also allows a relatively simple and uniform type of fixturing to be used in other parts of the process. In another aspect, by changing the interface plate 98, or other interface member as used on one of the other machines in the process, (see 98' in step G of FIG. 6) each lathe or other machine can be quickly and easily adapted for machining different bit bases, e.g. having different leg lengths and/or different skew and twist angles.

Numerous modifications of the above-described method and apparatus will suggest themselves to those of skill in the art. Accordingly, it is intended that the invention be limited only by the claims which follow.

What is claimed is:

1. A method of forming a base for use on a roller-cone-type rock bit of the type wherein a leg extension of the base is joined along a generally transverse end surface to a leg stub of a main body member to form a complete bit leg, comprising the steps of:
   providing a workpiece at least rough formed to comprise a leg extension work portion, having a preliminary end surface, and a trunnion work portion extending angularly from the leg extension work portion;
   on a rotatable holder portion of a lathe, mounting a first interface member with an indexing surface thereof facing generally radially inwardly but angled to correspond to a desired angular orientation of a trunnion in a finished bit;
   removably mounting the workpiece on the first interface member, with the preliminary end surface abutting the indexing surface, by connector means comprising at least one pin-type connector projecting from one of said surfaces into the other; and
   turning the trunnion work portion on the lathe.

2. The method of claim 1 comprising preforming the leg extension work portion to a length substantially less than a desired length of the complete bit.

3. The method of claim 1 comprising performing at least one threaded connecting bore and at least one positioning bore extending into the leg extension work portion through the preliminary end surface;
   wherein the pin-type connector is a workpiece screw; and
   wherein the mounting of the workpiece on the first interface member includes fitting a positioning pin extending from the indexing surface snugly into the positioning bore, and passing the workpiece screw through the first interface member and threading it into the threaded connecting bore.

4. The method of claim 3 comprising so forming two such positioning bores in the leg extension work portion, and so fitting a respective such positioning pin into each of the positioning bores.

5. The method of claim 4 wherein the positioning pins are snugly fitted into respective holding bores in the indexing surface.

6. The method of claim 4 wherein the workpiece screw is passed loosely through an oversized bore in the first interface member.

7. The method of claim 3 comprising so mounting the first interface member on a generally radially inwardly facing support surface of the holder portion of the lathe.

8. The method of claim 7 comprising counterbalancing the workpiece and the first interface member with an adjustable counterweight on the lathe prior to turning.

9. The method of claim 8 comprising bracing the workpiece on the lathe, distal the preliminary end surface, prior to and during turning.

10. The method of claim 2 wherein the turning comprises at least roughly forming a trunnion including an annular bearing surface; and further comprising:
   removing the workpiece from the first interface member after roughly turning the trunnion;
   then heat treating the trunnion;
   then remounting the workpiece on the first interface member;
   then fine turning the trunnion on the lathe.

11. The method of claim 10 wherein the rough turning further forms an annular ball race;
   the method further comprising
   after the rough turning and removal of the workpiece from the first interface member, but before the remounting and fine turning, forming a ball loading bore through the workpiece from a shirttail surface through the ball race.

12. The method of claim 11 wherein the ball loading bore is so formed before the heat treatment.

13. The method of claim 11 wherein, for forming the ball loading bore, the workpiece is mounted on a second interface member, similar to the first interface member in indexing surface and orientation, and by similar connector means, the second interface member being adapted for mounting on another type of machine from the lathe.

14. The method of claim 10 comprising, after the rough turning and removal, but before the remounting and fine turning, forming a lubricant supply bore opening through the bearing surface, and beveling the edge of the lubricant supply bore which opens through the bearing surface before remounting and fine turning.

15. The method of claim 14 wherein the fine turning is done with a ceramic tool at a speed of at least 500 surface feet per minute.

16. The method of claim 10 comprising, after the fine turning, again removing the workpiece from the first interface member;
   then removably mounting the workpiece on a third interface member, similar to the first interface member in indexing surface and orientation, and by similar connector means, but on another lathe;
   and super-finishing the bearing surface by rotating the workpiece on the other lathe while applying an abrasive stone-type tool to the bearing surface and reciprocating the stone-type tool parallel to the axis of the other lathe.

17. The method of claim 2 comprising, after the turning, removing the workpiece from the first interface member, then mounting the workpiece on a second interface member, similar to the first interface member in indexing surface and orientation, and by similar connector means, the second interface member being mounted on another type of machine from the lathe, then further machining the workpiece.

18. The method of claim 2 comprising, after the turning, removing the workpiece from the first interface member, then removably mounting the workpiece on another interface member, similar to the first interface member in indexing surface and orientation, and by similar connector means, but on another lathe;
   and super-finishing at least a portion of the trunnion work portion by rotating the workpiece on the other lathe while applying an abrasive stone-type tool to the trunnion work portion and reciprocating the stone-type tool parallel to the axis of the other lathe.

19. The method of claim 2 wherein the first interface member is removably mounted on the lathe, and comprising, after turning the trunnion work portion, removing the first interface member from the lathe, replacing the first interface member with a different interface member having a dissimilar indexing surface;
   removably mounting a different workpiece on the different interface member;
   and turning a trunnion work portion of the different workpiece on the lathe.

20. The method of claim 2 comprising, after turning the trunnion work portion, removing a part of the leg extension work portion, including the preliminary end surface and the connector means, by a cut forming a secondary end surface.

21. The method of claim 20 wherein the cut is made at a substantially non-perpendicular angle to the centerline of the trunnion, such that the secondary end surface is inclined radially and longitudinally inwardly in a finished bit.

22. Apparatus for forming bases for use on roller-cone-type rock bits of the type wherein a leg extension of a base is joined along a generally transverse end surface to a leg stub of a main body member to form a complete bit leg, comprising:
   a lathe having a rotatable holder portion;
   a first interface member mounted on the holder portion and having an indexing surface facing generally radially inwardly but angled to correspond to a desired angular orientation of a trunnion in a finished bit;
   a workpiece comprising a leg extension work portion, having a preliminary end surface, and a trunnion work portion extending angularly from the leg extension work portion, the workpiece being removably mounted on the interface member with the preliminary end surface abutting the indexing surface by connector means comprising at least one pin-type connector projecting from one of said surfaces into the other.

23. The apparatus of claim 22 wherein the length of the leg extension work portion is substantially less than a desired length of the complete bit.

24. The apparatus of claim 23 wherein the workpiece has at least one threaded connecting bore and at least one positioning bore, extending thereinto through the preliminary end surface;

wherein the pin-type connector is a workpiece screw extending through the first interface member and threaded into the connecting bore; and further comprising a positioning pin extending from the indexing surface snugly into the positioning bore.

25. The apparatus of claim 24 wherein the workpiece has two such positioning bores, and wherein there are two such positioning pins, each fitting into a respective one of the positioning bores.

26. The apparatus of claim 25 wherein the first interface member has two holding bores in the indexing surface, and wherein the positioning pins are snugly fitted into respective ones of the holding bores.

27. The apparatus of claim 25 wherein the first interface member has an oversized bore loosely receiving the workpiece screw.

28. The apparatus of claim 24 wherein the holder portion of the lathe defines a generally radially inwardly facing support surface, and wherein the first interface member is a plate-like member removably mounted on the support surface.

29. The apparatus of claim 28 wherein the support surface is interrupted by a gap accessible from a radially outer side of the holder portion and aligned with the connecting bore, whereby the workpiece screw may be inserted through the first interface member and threaded into the connecting bore of the workpiece.

30. The apparatus of claim 23 further comprising a counterweight adjustably mounted on the lathe generally diametrically opposite the support surface.

31. The apparatus of claim 30 further comprising adjustable bracing means interengageable between the lathe and a portion of the workpiece distal the preliminary end surface.

32. The apparatus of claim 23 wherein the first interface member is removably mounted on the holder portion, and further comprising additional interface members having indexing surfaces dissimilar to the indexing surface of the first interface member.

* * * * *

UNITED STATES PATENT AND TRADEMARK OFFICE
CERTIFICATE OF CORRECTION

PATENT NO.   : 5,201,795
DATED        : April 13, 1993
INVENTOR(S)  : Danny B. Howard and Daura Palmo It is certified that error appears in the above-identified patent and that said Letters Patent is hereby corrected as shown below:

In Column 10, Line 59, change "performing" to --preforming--.

In Column 11, Line 25, change "comprising:" to --comprising - --.

In Column 11, Line 34, change "comprising" to --comprising - --.

Signed and Sealed this

Fourth Day of January, 1994

Attest:

BRUCE LEHMAN

Attesting Officer

Commissioner of Patents and Trademarks